United States Patent
Han

(10) Patent No.: US 6,431,266 B1
(45) Date of Patent: Aug. 13, 2002

(54) DOOR PLATE DRIVING MECHANISM OF AIR CONDITIONING SYSTEM FOR AUTOMOBILE

(75) Inventor: Sang Chul Han, Taegu (KR)

(73) Assignee: Daewoo Automotive Components, Ltd., Taegu (KR)

( * ) Notice: Subject to any disclaimer, the term of this patent is extended or adjusted under 35 U.S.C. 154(b) by 0 days.

(21) Appl. No.: 09/365,827

(22) Filed: Aug. 3, 1999

(30) Foreign Application Priority Data

Aug. 6, 1998 (KR) .............................. 98-32037

(51) Int. Cl.[7] ................................................ B60H 1/00
(52) U.S. Cl. .................... 165/204; 165/42; 454/121; 74/89.18
(58) Field of Search .......................... 165/42, 43, 202, 165/203; 454/69, 121; 251/250.5, 288; 74/10.39, 10.8, 89.18, 109, 413

(56) References Cited

U.S. PATENT DOCUMENTS

| | | | | |
|---|---|---|---|---|
| 1,219,392 A | * | 3/1917 | Hagen | |
| 1,256,759 A | * | 2/1918 | Wilson | |
| 1,797,490 A | * | 3/1931 | Wilson | |
| 1,853,039 A | * | 4/1932 | Churchward | |
| 3,001,159 A | * | 9/1961 | Hilsinger, Jr. | |
| 4,258,580 A | * | 3/1981 | Lowe | 74/109 |
| 4,418,633 A | * | 12/1983 | Krautkremer et al. | 74/109 X |
| 5,016,493 A | * | 5/1991 | Han | 74/413 X |
| 5,620,301 A | * | 4/1997 | Lawer | 74/109 X |
| 5,881,994 A | * | 3/1999 | Stevenson et al. | 251/250.5 |
| 6,031,226 A | * | 2/2000 | Parekh et al. | 454/160 X |
| 6,095,007 A | * | 8/2000 | Brewington et al. | 74/89.18 X |
| 6,209,404 B1 | * | 4/2001 | Le | 74/89.18 |

FOREIGN PATENT DOCUMENTS

| | | | | | |
|---|---|---|---|---|---|
| GB | 2068593 A | * | 8/1981 | | 165/42 |
| GB | 2221018 A | * | 1/1990 | | 165/42 |

* cited by examiner

*Primary Examiner*—Ljiljana Ciric
(74) *Attorney, Agent, or Firm*—Jacobson Holman, PLLC

(57) ABSTRACT

A mechanism for driving a plurality of door plates of an air conditioning system for an automobile. An actuator generates a rotating force and has an output shaft. A main gear plate is secured to the output shaft of the actuator for being integrally rotated therewith. The main gear plate has a plurality of first toothed portions and a plurality of non-meshed rotation guide arms. The first toothed portions are formed on a circumferential outer surface of the main gear plate such that they are circumferentially spaced apart one from another. The non-meshed rotation guide arms are formed on a one surface of the main gear plate such that they are circumferentially spaced apart one from another and extend radially. A plurality of driving levers are fixed to the plurality of door plates, respectively.

11 Claims, 12 Drawing Sheets

DOOR PLATE DRIVING MECHANISM OF AIR CONDITIONING SYSTEM FOR AUTOMOBILE

BACKGROUND OF THE INVENTION

1. Field of the Invention

The present invention relates to a door plate driving mechanism of an air conditioning system for an automobile, and more particularly, the present invention relates to a door plate driving mechanism for an air conditioning system of an automobile, which has an improved structure for accomplishing selectively interlocked operations of a plurality of door plates which are rotatably secured to an air conditioning case and disposed in an air conditioning path to control air flow into a passenger compartment.

2. Description of the Prior Art

Conventionally, an air conditioning system for an automobile has an air conditioning case which is disposed behind an engine room. The air conditioning case is made of injection molded plastic, etc. and defines a part of an air conditioning path. In the air conditioning case, there are disposed a plurality of operating elements including a blower fan, an evaporator and a heater. A plurality of door plates are also disposed in the air conditioning case to selectively control opening and closing of a plurality of conduits which serve to supply air conditioned by the plurality of operating elements to various regions of a passenger compartment.

Each of the plurality of door plates has a rectangular plate-shaped configuration and is rotatably secured to the air conditioning case by a hinge shaft so that it can open and close a corresponding conduit. A plurality of driving levers are securely fixed to one end of the hinge shafts, respectively, which project out of the air conditioning case. The driving levers having various configurations and sizes, respectively, are rotated by a vacuum actuator, a motor actuator or the like. When driving levers selected relying upon an air conditioning mode are rotated by the actuator, corresponding door plates are also integrally rotated therewith to open or close corresponding conduits.

It is preferred that the plurality of door plates disposed in the air conditioning path are driven by one actuating means such as the motor actuator, to simplify the structure and reduce manufacturing cost of the air conditioning system. In this connection, various door plate driving mechanisms for selectively driving the plurality of door plates using one actuating means, are disclosed in the art.

In an exemplary door plate driving mechanism of the prior art, a plurality of driving levers are securely fixed to hinge shafts of a plurality of door plates, respectively. Each of the driving levers is formed with an upright pin, and a driving plate is arranged above the driving levers. The driving plate is formed with a plurality of guide grooves into which the upright pins of the driving levers are inserted, respectively. The driving plate is connected to an actuator means, and the plurality of guide grooves incorporate pivoting routes of the plurality of driving levers, respectively. If the driving plate is rotated by the actuator means, the driving levers are rotated around the hinge shafts, respectively, to control driving modes of the plurality of door plates.

In another door plate driving mechanism of the prior art, a plurality of driving levers securely fixed to hinge shafts of a plurality of door plates, respectively, are connected through a plurality of articulated links to a driving plate to drive the plurality of door plates in a selectively interlocked manner relying upon an air conditioning mode.

However, the door plate driving mechanisms of the prior art have deficiencies as described below:

(1) Since the structure of the door driving mechanism of the prior art has a number of the components, manufacturing cost is increased.

(2) The hinge shafts of the respective door plates, driving levers securely fixed to the hinge shafts, and driving plate connected directly or via the plurality of articulated links to the driving levers have kinematic limits in their operations, whereby noise is generated. Further, geometrical critical points on which operations of the components cannot be properly controlled, exist in the door plate driving mechanism.

(3) Since the plurality of driving levers are simultaneously operated, driving force generated by the actuator must be fairly large.

(4) Since the plurality of components are interconnected one to another, tolerances in manufacturing the components and allowances in assembling the components become smaller. For this reason, assembling time is lengthened, assembling errors occur frequently, and difficulties arise in A/S.

Hereinafter, a door plate driving mechanism according to the prior art will be described in detail with reference to FIGS. 1 through 5.

First, referring to FIG. 1, there is shown a cross-sectional view schematically illustrating a construction of an air conditioning system for an automobile. An air conditioning path 1 defined by a plurality of air conditioning cases 10 includes a blower fan 2, an evaporator 3, a heater 4 and a plurality of door plates as being operating doors. A heater door plate HT for controlling discharge of air which is passed through the heater 4, a vent door plate VT for controlling discharge of air toward a driver seat, and a defrost door plate DF opened under a defrosting mode, are integrally assembled onto a selected plane of one air conditioning case 10. The drawing reference numeral 5 represents a temperature-adjusting door plate.

Accordingly, the heater door plate HT, vent door plate VT and defrost door plate DF which constitute the plurality of door plates, are rotatably secured to the air conditioning case by hinge shafts, respectively. The air conditioning case is made of injection molded plastic and has a box-shaped configuration. While the plurality of door plates are driven by a vacuum actuator or a motor actuator, it is important that the plurality of door plates are designed such that they are smoothly driven in selectively interlocked manners by an actuator having a capacity as low as possible. This is because the air conditioning case 10 is not large in its size and the number of components must be as small as possible in view of manufacturing cost and controllability thereof.

For this purpose, door plate driving mechanisms for driving the plurality of door plates using one actuating means, are disclosed in the art. An example of the door plate driving mechanisms is illustrated in FIGS. 2 through 5. Referring to FIG. 2, there is shown a perspective view illustrating an air conditioning case on which a door plate driving mechanism of the prior art is mounted. FIG. 3A is a perspective view showing an independent appearance of a driving plate used in the door plate driving mechanism of FIG. 2.

The plurality of door plates are selectively operated while they are interlocked with a driving plate. In one example, driving modes of each door plate are given as described in Table 1, relying upon an air conditioning mode.

To be operated under the exemplary driving modes given in Table 1, the vent door plate VT, defrost door plate DF and heater door plate HT are rotatably secured to the air conditioning case 10 by the respective hinge shafts 11, 12 and 13. Driving levers 21, 22 and 23 are securely fixed to one end of the hinge shafts 11, 12 and 13, respectively, which project out of the air conditioning case 10.

TABLE 1

| Opening Door Plates | Degree of VENT | Air Conditioning Modes |  |  |  |
|---|---|---|---|---|---|
|  |  | BI-LEVEL | HEATER | HTR/DEF | DEF |
| Vent Door Plate (VT) | 1 | ½ | 0 | 0 | 0 |
| Defrost Door Plate (DE) | 0 | 0 | 0 | ½ | 1 |
| Heater Door Plate (HT) | 0 | ½ | 1 | ½ | 0 |

Remarks: 0 Closed, ½: Half-opened or closed, 1: Opened

Three intermediate levers 31, 32 and 33 are also rotatably secured to the plane of the air conditioning case 10 adjacent to the driving levers 21, 22 and 23, respectively. The intermediate levers 31, 32 and 33 are meshed with the driving levers 21, 22 and 23, respectively, and are formed with three upright pins 41, 42 and 43, respectively. By the fact that the upright engaging pins 41, 42 and 43 are inserted into guide grooves 51, 52 and 53, respectively, which are formed in the driving plate 50, the intermediate levers 31, 32 and 33 are connected to the driving plate 50 so that they can rotate by the rotation of the driving plate 50. The driving plate 50 is connected by a shaft to the actuator 55 such as the vacuum actuator, motor actuator, or the like, to be driven thereby.

The respective guide grooves 51, 52 and 53 formed in the driving plate 50, include a plurality of arc-shaped portions communicated one to another. The arc-shaped portions of the respective guide grooves 51, 52 and 53 are geometrically designed such that when the driving plate 50 is rotated by the actuator 55, it operates the vent door plate VT, defrost door plate DF and heater door plate HT under the driving modes as given in the Table 1.

An exemplary driving mode is shown in FIG. 3B which is a schematic plan view for explaining operations of the door plate driving mechanism according to the prior art. As described above, when the driving plate 50 which is formed with the guide grooves 51, 52 and 53 each including the plurality of arc-shaped portions is rotated by the actuator 55, the door plates VT, DF and HT are selectively operated under a plurality of air conditioning modes including VENT, BI-LEVEL, HTR, HTR/DEF, and DEF modes (Details of the arc-shaped portions, and positions of the intermediate levers 31, 32 and 33 relative to the driving plate 50 will not be described).

Referring to FIG. 4, there is shown a perspective view similar to FIG. 2, for illustrating a state in which the driving plate is removed from the door plate driving mechanism.

In the door plate driving mechanism of the prior art, constructed as mentioned above, a number of components must be assembled within a narrow allowance. If a size of an air conditioning case is varied in accordance with a change in air conditioning capacity, geometrical configurations of the plurality of guide grooves must be newly designed on a new driving plate. However, since the design of the geometrical configurations of the guide grooves are performed on a trial and error basis, a great deal of effort and time is required.

Referring to FIG. 5, there is shown a perspective view illustrating an air conditioning case on which another door plate driving mechanism of the prior art is mounted.

For driving the heater door plate HT, vent door plate VT and defrost door plate DF which constitute the plurality of door plates, a plurality of links L1, L2, L3, L4, L5 and L6 are provided to connect the door plates HT, VT and DF to a driving plate. However, this door plate driving mechanism still has the above-stated problems of the prior art.

Hence, the door plate driving mechanisms of the prior art have problems in that its structure is complicated, its operation reliability is reduced, a break-down may be caused by kinematic limits due to assembling allowances, and manufacturing cost is elevated.

Therefore, a demand for a door plate driving mechanism which has improved operation reliability and is capable of eliminating worry about break-down due to assembling allowances, is increasing in the art.

SUMMARY OF THE INVENTION

Accordingly, the present invention has been made in an effort to solve the problems occurring in the prior art, and an object of the present invention is to provide a door plate driving mechanism of an air conditioning system for an automobile, which has a simple structure to decrease the number of components and reduce manufacturing cost while enhancing operational reliability.

In order to achieve the above object, according to one aspect of the present invention, there is provided a mechanism for driving a plurality of door plates of an air conditioning system for an automobile, the door plates being rotatably mounted to an air conditioning case for being operated under a multitude of air conditioning modes, the air conditioning case defining a part of an air conditioning path, the mechanism comprising: actuator means for generating a rotating force to operate at least one door plate under a selected air conditioning mode, the actuator means having an output shaft; a main gear plate secured to the output shaft of the actuator means and having a first driving section and a first mesh limiting section which are integrally stacked with each other, the first driving section having a plurality of first toothed portions for transferring the rotating force, the first mesh limiting section having a predetermined mesh limiting construction for performing the selected air conditioning mode; and a plurality of driving levers fixed to the plurality of door plates, respectively, each of the driving levers having a second driving section and a second mesh limiting section which are integrally stacked with each other, the second driving section having a second toothed portion which is capable of being meshed with at least one of the plurality of first toothed portions of the main gear plate for driving at least one door plate under the selected air conditioning mode, the second mesh limiting section cooperating with the first mesh limiting section for effecting non-meshed rotation of the main gear plate.

According to another aspect of the present invention, there is provided a mechanism for driving a plurality of door plates of an air conditioning system for an automobile, the door plates being rotatably mounted to an air conditioning case for being operated under a multitude of air conditioning modes, the air conditioning case defining a part of an air conditioning path, the mechanism comprising: actuator for generating a rotating force, the actuator having an output shaft; a main gear plate secured to the output shaft of the actuator for being integrally rotated therewith and having a plurality of first toothed portions and a plurality of non-meshed rotation guide arms, the first toothed portions being formed on a circumferential outer surface of the main gear plate such that they are circumferentially spaced apart one from another, the non-meshed rotation guide arms being formed on one surface of the main gear plate such that they are circumferentially spaced apart one from another and extend radially; and a plurality of driving levers fixed to the plurality of door plates, respectively, each of the plurality of driving levers having a second toothed portion which is capable of being meshed with at least one of the plurality of first toothed portions of the main gear plate and being able to have a rounded guide portion on which at least one of the plurality of non-meshed rotation guide arms can slide to effect non-meshed rotation of the main gear plate thereby to operate at least one door plate under a selected air conditioning mode.

According to still another aspect of the present invention, there is provided a door plate driving mechanism of an air conditioning system for an automobile, comprising: a heater door plate, a vent door plate and a defrost door plate disposed on the same plane of an air conditioning case for being operated under a multitude of air conditioning modes, the air conditioning case defining a part of an air conditioning path; first through third driving levers secured to hinge shafts of the heater door plate, vent door plate and defrost door plate for driving them while being integrally rotated therewith, respectively, each of the first through third driving levers having teeth; a main gear plate for selectively rotating at least one of the first through third driving levers while being meshed with the teeth of the first through third driving levers, relying upon a selected air conditioning mode; and mesh limiting means provided to the first through third driving levers and the main gear plate for selectively restraining the teeth of the first through third driving levers from being meshed with the main gear plate while the main gear plate is rotated, relying upon the selected air conditioning mode.

The first through third driving levers have sector gear-shaped configurations which have predetermined radii of curvature from centers of the hinge shafts and predetermined central angles.

The mesh limiting means provided to the first and second driving levers comprise a plurality of guide members which are integrally formed with the first and second driving levers, respectively, each of the guide members having a rib section and a guide section, the rib section having a plate-shaped configuration and extending radially, the guide section being fastened to one end of the rib section and having a rounded guide face of a predetermined radius of curvature from a center of the main gear plate.

The main gear plate has a disk-shaped configuration, and includes a plurality of operating areas over which teeth are formed on a circumferential outer surface thereof and a plurality of non-operating areas over which no teeth are formed on the circumferential outer surface thereof.

The mesh limiting means provided to the main gear plate having the disk-shaped configuration and including the plurality of operating areas over which teeth are formed and the plurality of non-operating areas over which no teeth are formed, comprises a plurality of non-meshed rotation guide arms which are integrally formed on a one surface of the main gear plate and have predetermined radial lengths from the center of the main gear plate, the plurality of non-meshed rotation guide arms forming a plurality of predetermined controlling angles each of which is defined between two adjacent non-meshed rotation guide arms and having one end which can slide on the rounded guide faces of the first through third driving levers, respectively.

The predetermined radii of curvature of the rounded guide faces of the first and second driving levers are substantially the same with the predetermined radial lengths of the non-meshed rotation guide arms which correspond to the first and second driving levers, respectively.

The door plate driving mechanism further comprises a reverse gear plate for reversely rotating the heater door plate, the reverse gear plate having teeth which are formed on an entire circumferential outer surface thereof.

A selective operation of the heater door plate, vent door plate and defrost door plate relying upon the selected air conditioning mode is implemented by selective meshing between the teeth formed on the circumferential outer surface of the main gear plate over the plurality of operating areas and the teeth formed on the first through third driving levers, and by selective sliding engagement between the one ends of the plurality of non-meshed rotation guide arms and the rounded guide faces of the first through third driving levers.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
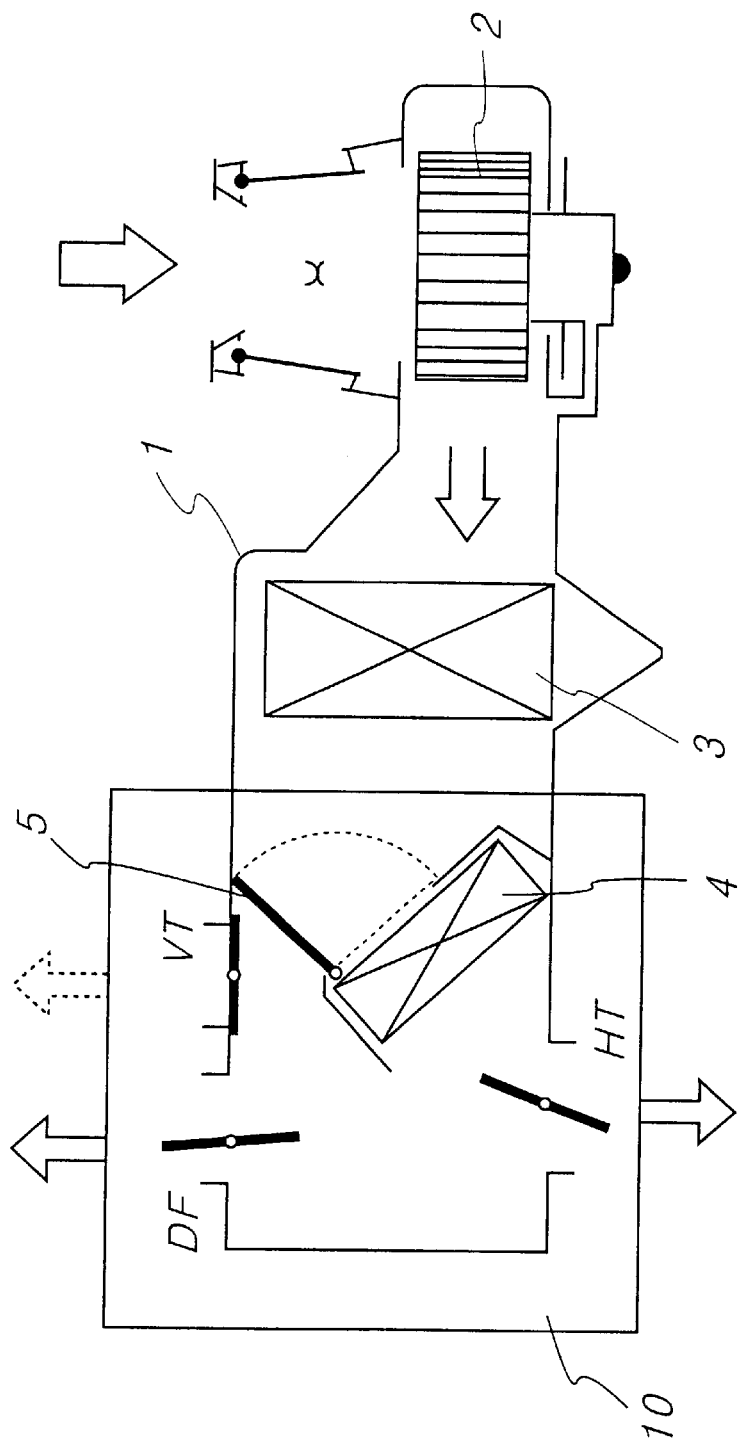
FIG. 1 is a cross-sectional view schematically illustrating a construction of an air conditioning system for an automobile.
Figure 2:
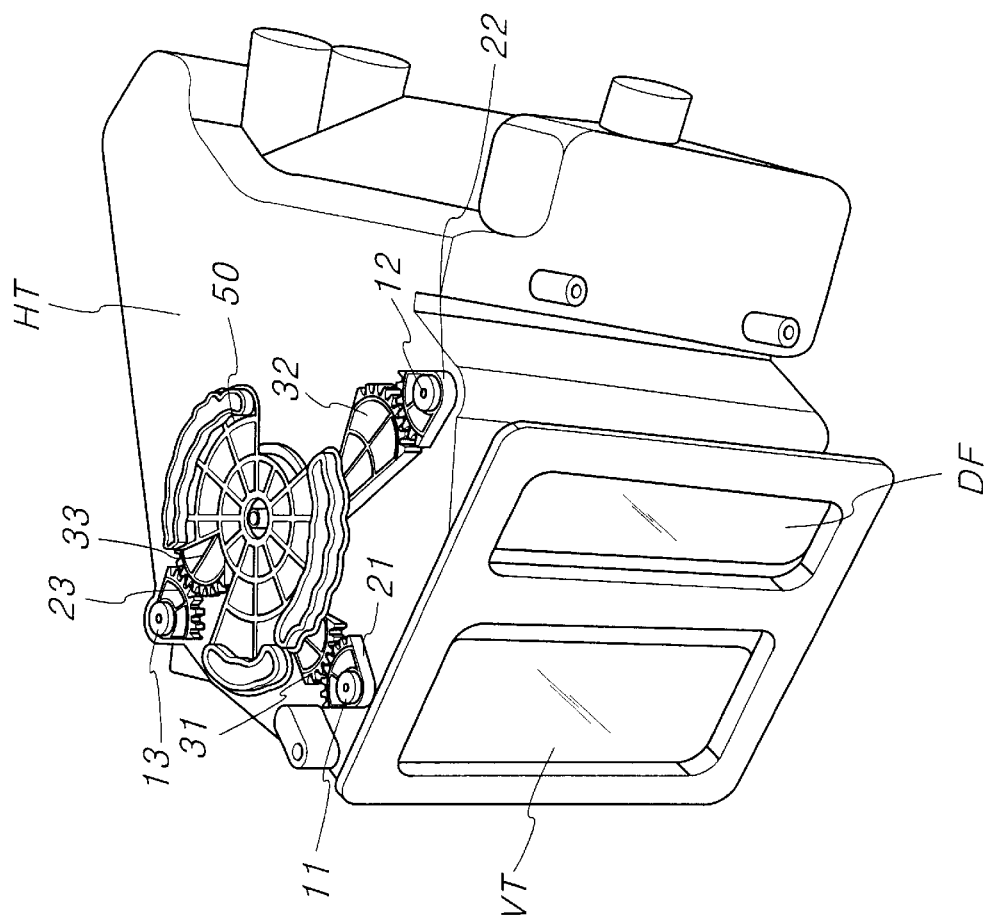
FIG. 2 is a perspective view illustrating an air conditioning case on which a door plate driving mechanism of the prior art is mounted.
Figure 3B:
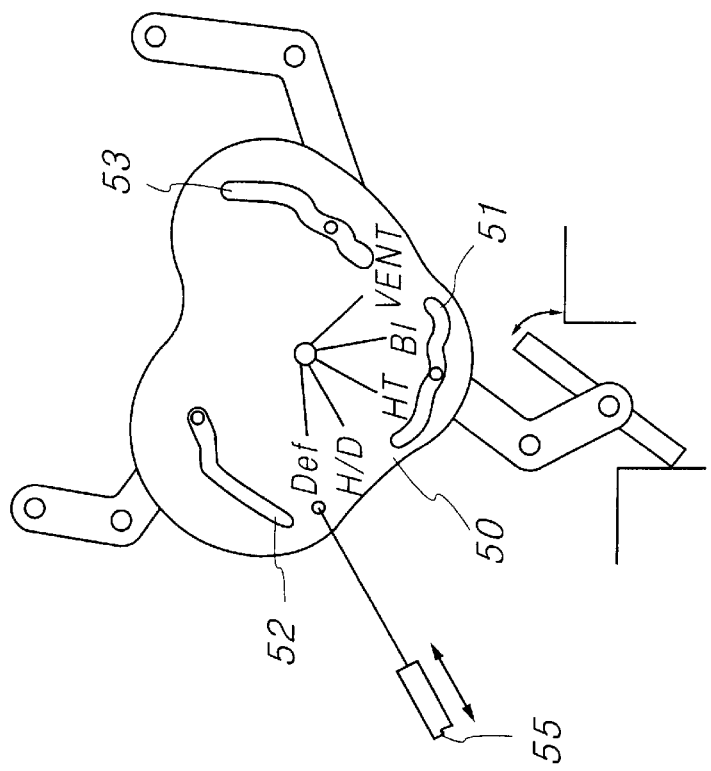
FIG. 3B is a schematic plan view for explaining the operation of the door plate driving mechanism according to the prior art.
Figure 3A:
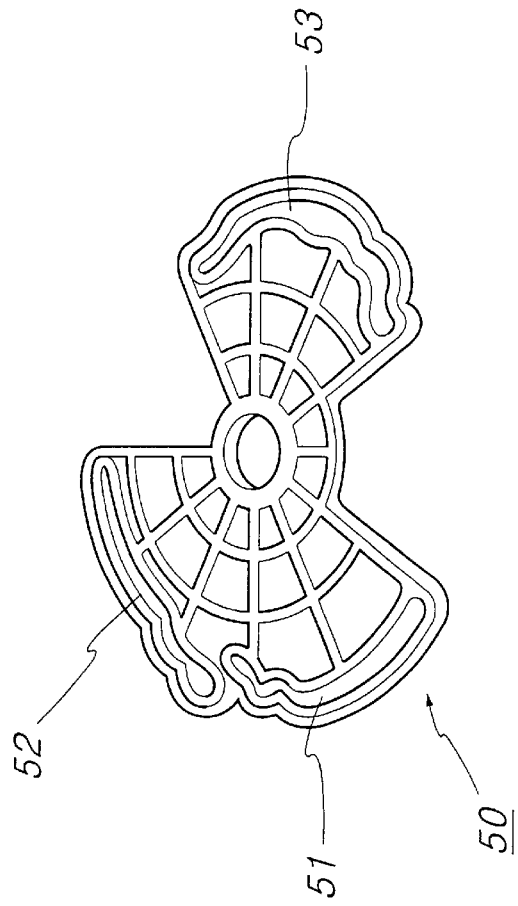
FIG. 3A is a perspective view independently showing a driving plate used in the door plate driving mechanism of FIG. 2.
Figure 4:
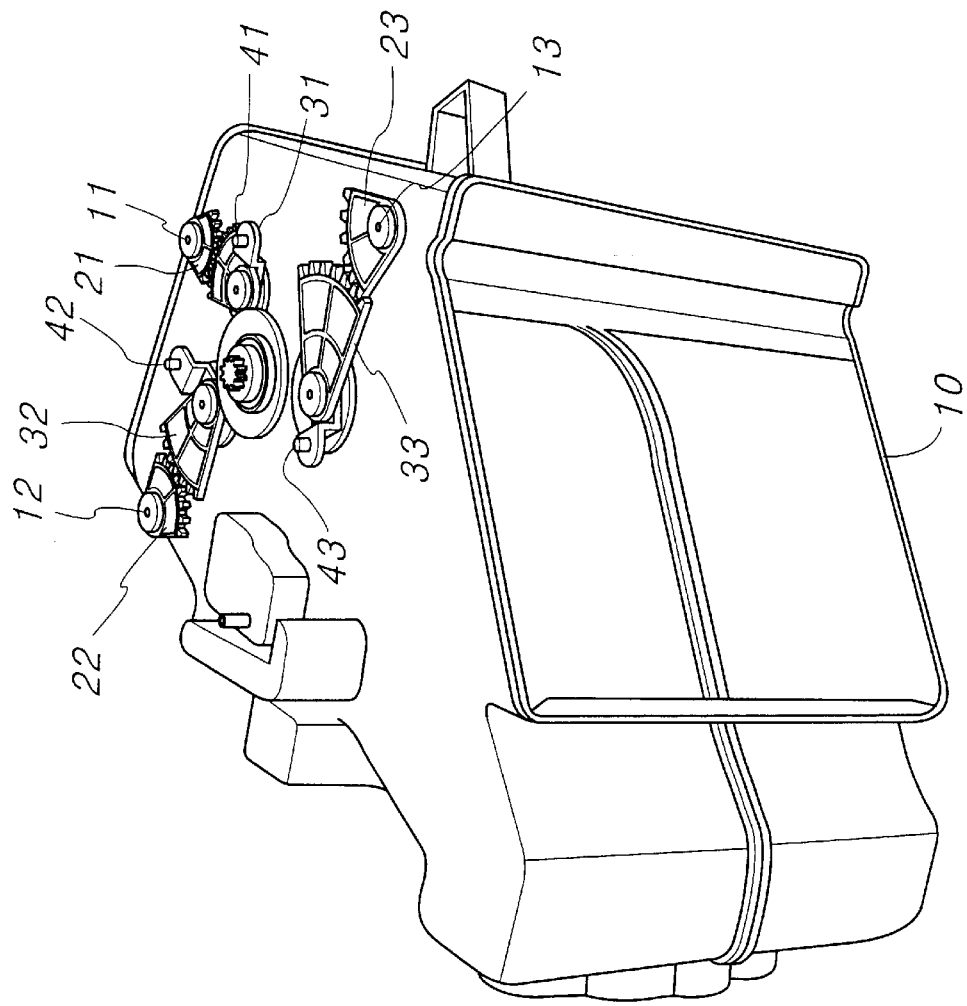
FIG. 4 is a perspective view similar to FIG. 2, for illustrating the driving plate separately from the door plate driving mechanism.
Figure 5:
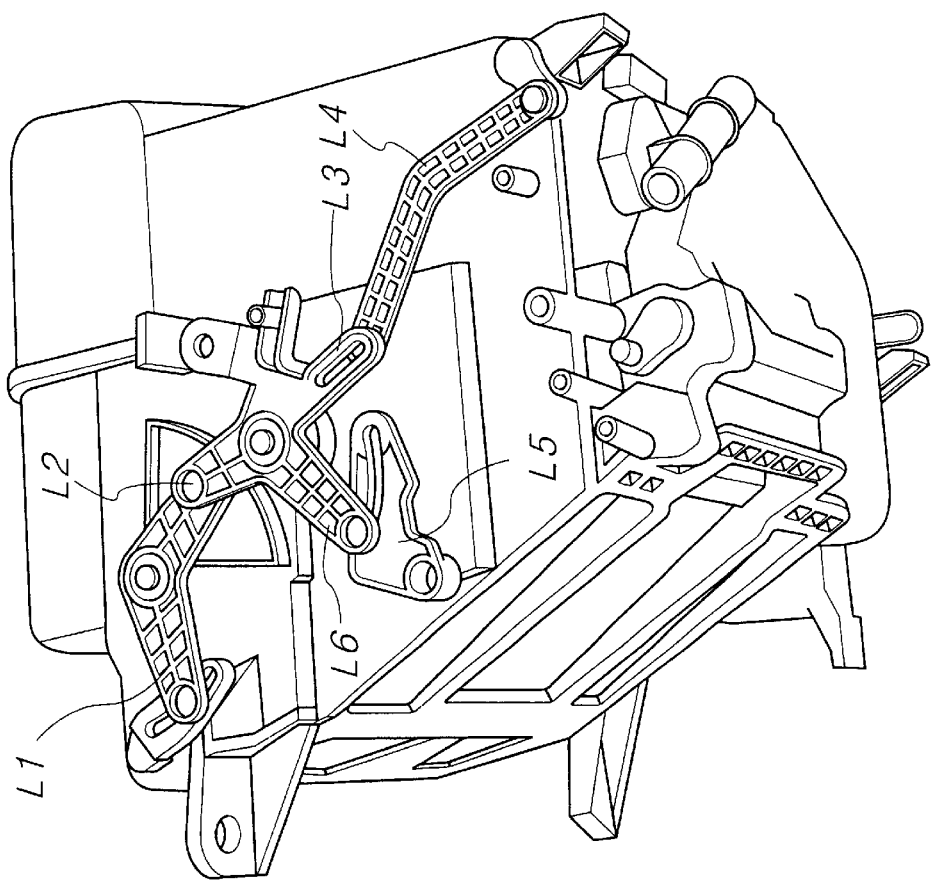
FIG. 5 is a perspective view illustrating an air conditioning case on which another door plate driving mechanism of the prior art is mounted.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 6:
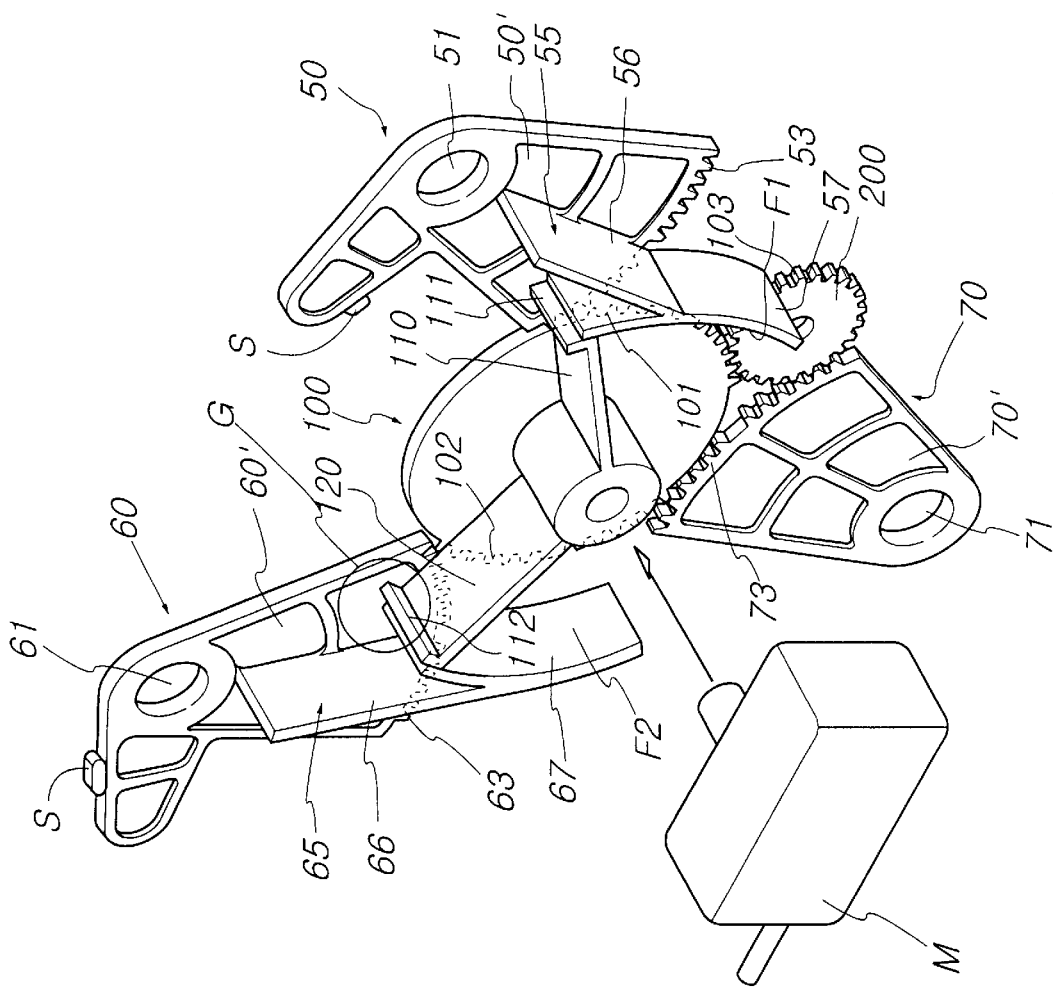
FIG. 6 is a perspective view illustrating a construction of a door plate driving mechanism of an air conditioning system for an automobile, in accordance with an embodiment of the present invention.
Figure 7:
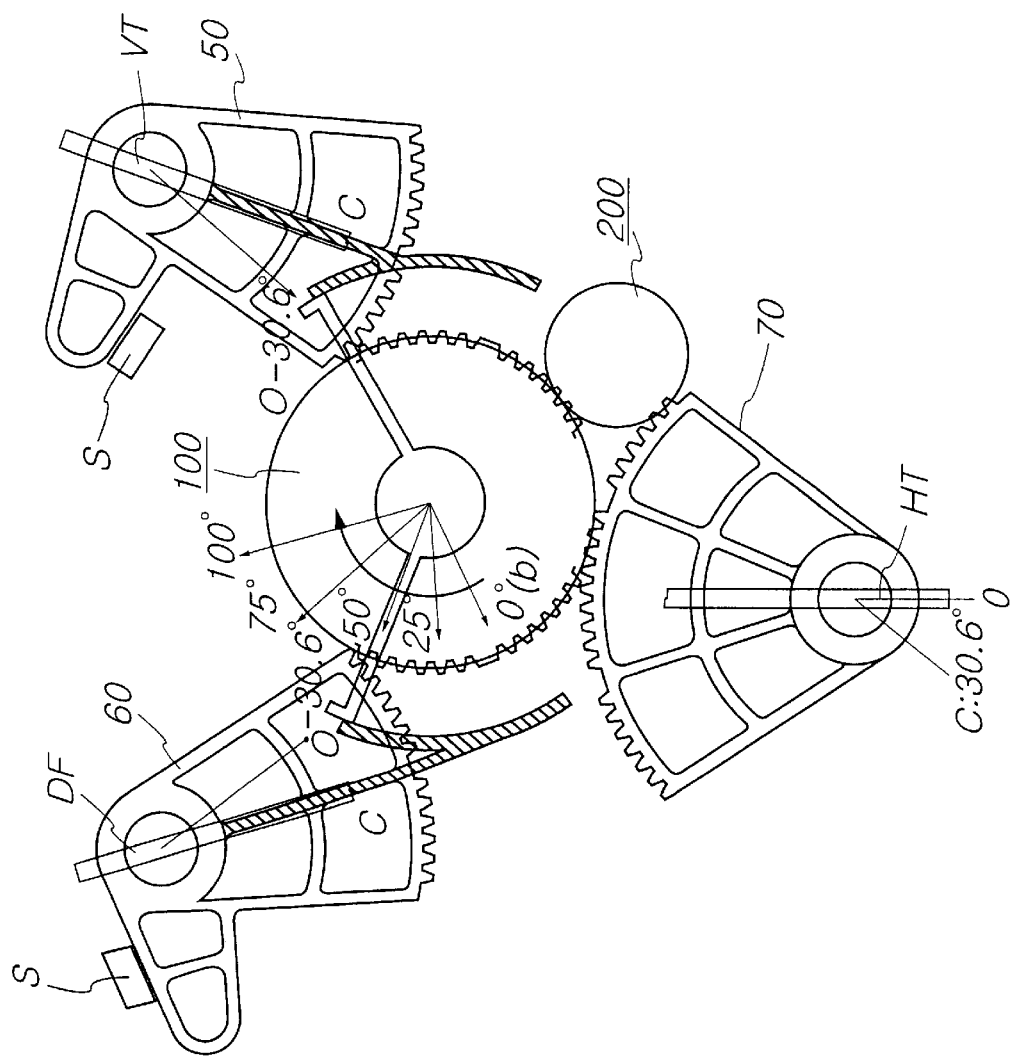
FIG. 7 is a plan view for explaining the operation of the door plate driving mechanism of the present invention.
Figure 8:
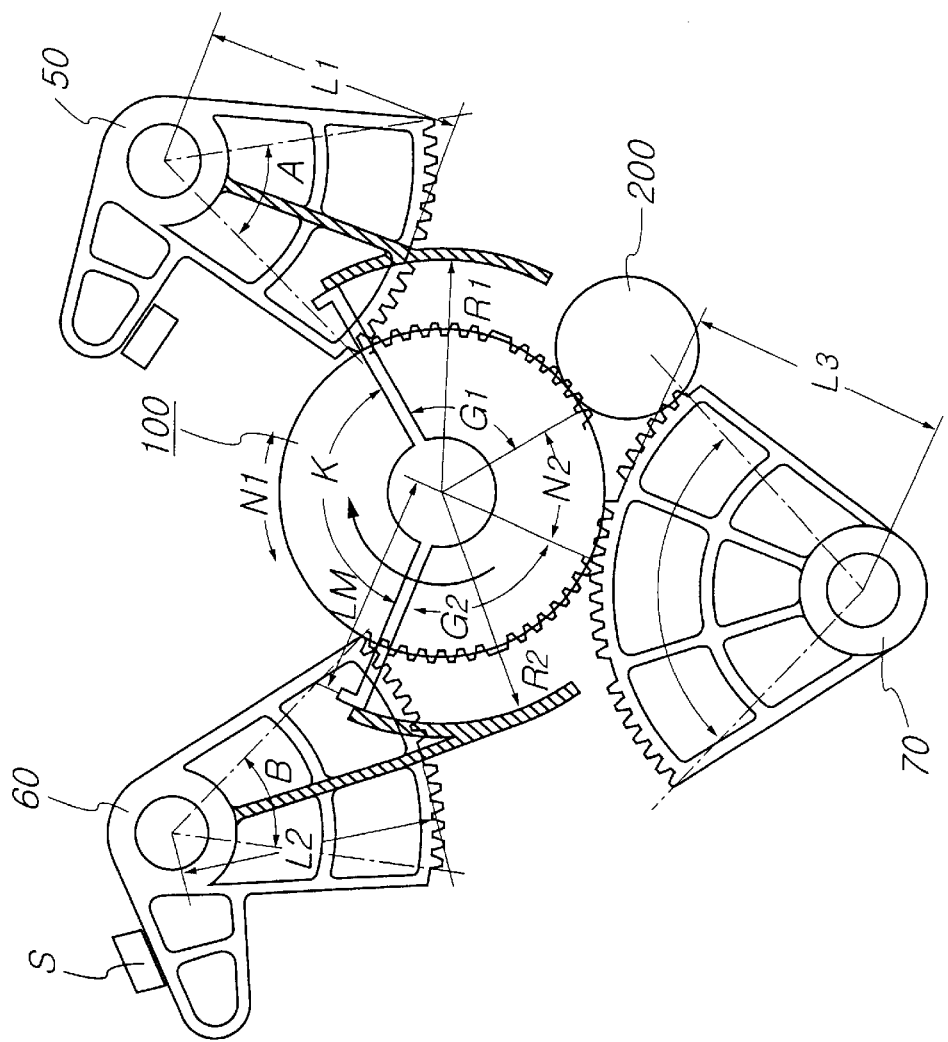
FIG. 8 is a plan view similar to FIG. 7, for denoting the dimensions of respective components which constitute the door plate driving mechanism of the present invention.

Referring to FIG. 6, there is shown a perspective view illustrating a construction of a door plate driving mechanism of an air conditioning system for an automobile, in accordance with an embodiment of the present invention. FIG. 7 is a plan view for explaining operations of the door plate driving mechanism of the present invention; and FIG. 8 is a plan view similar to FIG. 7, for denoting dimensions of respective components which constitute the door plate driving mechanism of the present invention.

A door plate driving mechanism of an air conditioning system for an automobile according to the present invention, includes a heater door plate HT, a vent door plate VT and a defrost door plate DF which are disposed on the same plane of an air conditioning case 10. According to the present invention, non-meshed rotation guide means for selectively rotating or stopping the door plates HT, VT and DF are provided to at least two driving levers and a main gear plate for rotating the driving levers, to simultaneously perform open/close drive of the door plates HT, VT and DF and mode operation establishment, whereby the number of components is reduced and operation reliability is improved.

A first driving lever 50, a second driving lever 60 and a third driving lever 70 are securely fixed to a hinge shaft 11 of the vent door plate VT, a hinge shaft 12 of the defrost door plate DF and a hinge shaft 13 of the further includes a main gear plate 100 for rotating the driving levers 50, 60 and 70 in a selectively interlocked manner.

The first driving lever 50 serves to drive the vent door plate VT and has a hinge hole 51 into which the hinge shaft 11 of the vent door plate VT is fitted to be integrally rotated therewith. The first driving lever 50 possesses a sector gear-shaped configuration, and has a radius of curvature L1 when measured from a center of the hinge hole 51 and a central angle A. The first driving lever 50 is made of synthetic resin, etc. and also has teeth 53 formed at a distal end thereof.

As can be readily seen from FIG. 6, the first driving lever 50 is integrally formed with a first guide member 55 for selectively guiding a non-meshed rotation of the main gear plate 100. The first guide member 55 has a rib section 56 which is integrally formed with the first driving lever 50 and a guide section 57 which is fastened to one end of the rib section 56. The rib section 56 has a plate-shaped configuration and extends radially. The guide section 57 has a rounded guide face F1 which has a radius of curvature R1 when measured from a center of the main gear plate 100.

The second driving lever 60 serves to drive the defrost door plate DE and has a hinge hole 61 into which the hinge shaft 12 of the defrost door plate DF is fitted to be integrally rotated therewith. The second driving lever 60 possesses a sector gear-shaped configuration, and has a radius of curvature L2 when measured from a center of the hinge hole 61 and a central angle B. The second driving lever 60 is made of synthetic resin, etc. and also has teeth 63 formed at a distal end thereof.

As can be readily seen from FIG. 6, the second driving lever 60 is integrally formed with a second guide member 65 for selectively guiding a non-meshed rotation of the main gear plate 100. The second guide member 65 has a rib section 66 which is integrally formed with the second driving lever 60 and a guide section 67 which is fastened to one end of the rib section 66. The rib section 66 has a plate-shaped configuration and extends radially. The guide section 67 has a rounded guide face F2 which has a radius of curvature R2 when measured from the center of the main gear plate 100.

The third driving lever 70 serves to drive the heater door plate HT and has a hinge hole 71 into which the hinge shaft 13 of the heater door plate HT is fitted to be integrally rotated therewith. The third driving lever 70 possesses a sector gear-shaped configuration, and has a radius of curvature L3 when measured from a center of the hinge hole 71 and a central angle C. The third driving lever 70 is made of synthetic resin, etc. and also has teeth 73 formed at a distal end thereof. As can be readily seen from FIG. 6, the third driving lever 70 does not have any guide member.

In accordance with a preferred embodiment of the present invention, the respective first through third driving levers 50, 60 and 70 are formed with a plurality of openings 50', 60' and 70' which function to lessen weights of the first through third driving levers 50, 60 and 70, respectively. The first through third driving levers 50, 60 and 70 are constructed such that they cooperate with the main gear plate 100.

The main gear plate 100 has a disk-shaped configuration to have a circular cross-section, and is made by injection-molding or forming synthetic resin, etc. According to a preferred embodiment of the present invention, the main gear plate 100 includes two meshing areas G1 and G2 and two non-meshing areas N1 and N2. In the meshing areas G1 and G2, teeth 101 and 102 are formed on a circumferential outer surface of the main gear plate 100, respectively. On the other hand, in the non-meshing areas N1 and N2, teeth are not formed on the circumferential outer surface of the main gear plate 100.

The main gear plate 100 includes a pair of non-meshed rotation guide arms 110 and 120 which are integrally formed on a one surface thereof. The pair of non-meshed rotation guide arms 110 and 120 have a radial length LM and a predetermined controlling angle K defined therebetween. The non-meshed rotation guide arms 110 and 120 are shaped such that distal ends of them can slide on the rounded guide faces F1 and F2 of the guide sections 57 and 67 of the first and second driving levers 50 and 60, respectively. In this connection, radii of curvature L1 and L2 of the respective rounded guide faces F1 and F2 are determined so that they are equal to the radial length LM of the non-meshed rotation guide arms 110 and 120. Distal ends of the non-meshed rotation guide arms 110 and 120 are formed with sliding sections 111 and 112, respectively, which are rounded at their free end surfaces to promote sliding engagement of the sliding sections 111 and 112 with the rounded guide faces F1 and F2, respectively.

The door plate driving mechanism of the present invention further includes a reverse gear plate 200 which has teeth 103 formed on an entire circumferential outer surface thereof and functions to reversely rotate the heater door plate HT. Drawing reference sign S represents stoppers for preventing the first and second driving levers 50 and 60 from being rotated beyond a predetermined angle.

In the door plate driving mechanism of the present invention, the radius of curvature L1 and central angle A of the first driving lever 50, the radius of curvature R1 of the rounded guide face F1 of the guide section 57 of the first guide member 55, the radius of curvature L2 and central angle B of the second driving lever 60, the radius of curvature R2 of the rounded guide face F2 of the guide section 67 of the second guide member 65, the radius of curvature L3 and central angle C of the third driving lever 70, the meshing areas G1 and G2 of the main gear plate 100, and the controlling angle K defined between the pair of non-meshed rotation guide arms 110 and 120, are determined depending upon (1) sizes of the air conditioning case 10 and door plates VT, DF and HT, (2) positions of the respective door plates VT, DF and HT on the air conditioning case 10, (3) operation starting points and ending points and holding times of the door plates VT, DF and HT under the respective air conditioning modes, and (4) operating sequence of the door plates VT, DF and HT.

In the door plate driving mechanism, the main gear plate 100 may be rotated by various kinds of actuators. As an example, in FIG. 6, the main gear plate 100 is illustrated as being rotated by a motor actuator M. However, it is to be readily understood that the main gear plate 100 can be rotated through levers by a vacuum actuator.

In the present invention, the driving levers 50, 60 and 70 and the main gear plate 100 can simultaneously perform selective open and close driving of the door plates VT, DF and HT and establishment of the operating areas, operating starting points and ending points, with a minimum number of components.

Hereinafter, operations of the door plate driving mechanism of the present invention, constructed as mentioned above, will be described in detail.

The vent door plate VT, defrost door plate DF and heater door plate HT which are mounted to the air conditioning case 10, are connected to the first through third driving levers 50, 60 and 70, respectively, such that they are positioned at an opening point O and closing points C. In other words, the vent door plate VT is positioned at the opening point O at a reference angle b of the main gear plate 100, and the defrost door plate DF and heater door plate HT are positioned at the closing points C at the reference angle b of the main gear plate 100.

In this state, if the variables described above are determined such that the door plates VT, DF and HT are selectively closed or opened when the first through third driving levers 50, 60 and 70 are rotated by about 30, respectively, the main gear plate 100 performs the air conditioning modes while being rotated within a range of about 100 in a clockwise or counterclockwise direction.

Referring to FIG. 8, which illustrates a state that the main gear plate 100 is rotated by about 50 in a clockwise direction from the reference angle b, the first driving lever 50 for driving the vent door plate VT is rotated to the closing point C so that teeth 53 of the first driving lever 50 finish meshing with the teeth 101 of the main gear plate 100. Also, the defrost door plate DF is maintained in the closing point C, and the heater door plate HT is rotated to the opening point O (see the heater mode HTR of Table 1 and FIG. 10).

Figure 9:
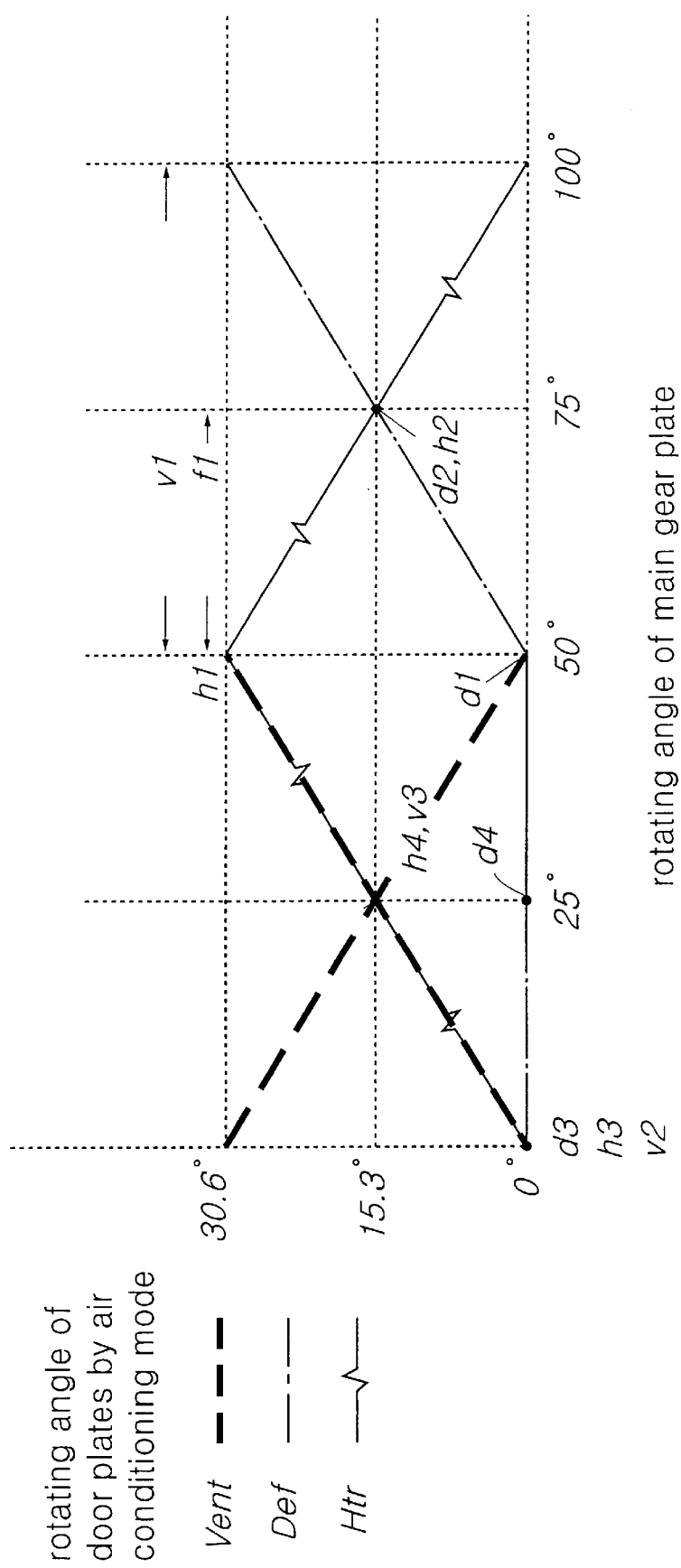
FIG. 9 is a graph showing correlation between rotating angles of a main gear plate and rotating angles of door plates in the door plate driving mechanism according to the present invention.

If the main gear plate 100 is further rotated in a clockwise direction from the 50 rotated position, the first driving lever 50 and the main gear plate 100 do not mesh any more with each other, and the sliding section 111 formed at the distal end of the non-meshed rotation guide arm 110 of the main gear plate 100 slides on the rounded guide face F1 formed on the guide section 57 of the first guide member 55 of the first driving lever 50. At this time, the sliding engagement of the sliding section 111 with the rounded guide face F1 is promoted by the fact that they have substantially the same radius of curvature. Accordingly, the non-meshing area N1 of the main gear plate 100 passes over the teeth 53 of the first driving lever 50 while not being meshed therewith (v1 of FIG. 9, which corresponds to an area between the 50 rotated position and 100 rotated position of the main gear plate 100). However, as the sliding section 112 formed at the distal end of the non-meshed rotation guide arm 120 of the main gear plate 100 is disengaged from the rounded guide face F2 formed on the guide section 67 of the second guide member 65 of the second driving lever 60 for driving the defrost door plate DF, the teeth 102 formed over the meshing area G2 of the main gear plate 100 are meshed with the teeth 63 of the second driving lever 60 to rotate the second driving lever 60 in a counterclockwise direction. Hence, the defrost door plate DF begins to be opened (d1). Further, as the teeth 101 of the main gear plate 100 are meshed with the teeth 103 of the reverse gear plate 200, which in turn are meshed with the teeth 73 of the third driving lever 70, the heater door plate HT begins to be closed (h1).

Figure 10:
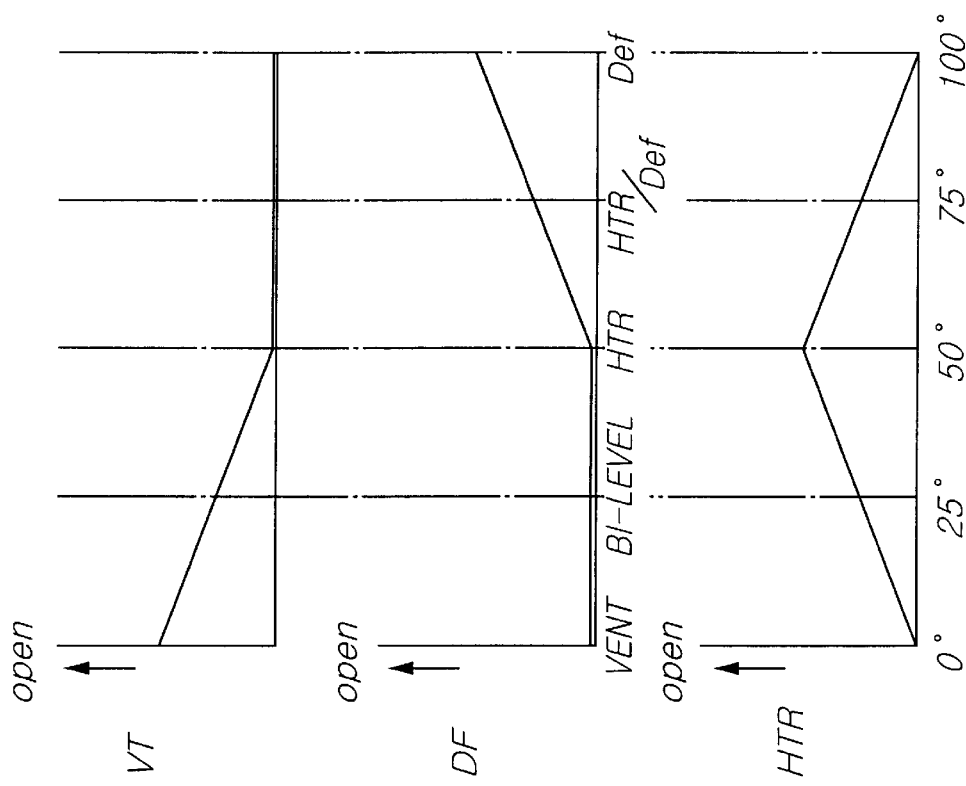
FIG. 10 is a graph showing correlation between rotating angles of the main gear plate and opening degrees of the respective door plates relying upon an air conditioning mode, in the door plate driving mechanism according to the present invention.

If the main gear plate 100 is rotated to a 75 rotated position in a clockwise direction, the vent door plate VT is maintained in a closed state (f1), the defrost door DF is half-opened (d2), and the heater door plate HT is half-closed (h2), to define the heater-defrost mode HTR/DEF of Table 1 and FIG. 10.

If the main gear plate 100 is rotated to a 100 rotated position in a clockwise direction, the vent door plate VT is still maintained in the closed state, the defrost door plate DF is fully opened, and the heater door plate HT is fully closed, to define the defrost mode DEF of Table 1 and FIG. 10.

If the main gear plate 100 is rotated in a counterclockwise direction from the 50 rotated position to the reference angle b, the second driving lever 60 and the main gear plate 100 do not mesh with each other, and the sliding section 112 formed at the distal end of the non-meshed rotation guide arm 120 of the main gear plate 100 slides on the rounded guide face F2 formed on the guide section 67 of the second guide member 65 of the second driving lever 60. At this time, the sliding engagement of the sliding section 112 with the rounded guide face F2 is promoted by the fact that they have substantially the same radius of curvature. Accordingly, the non-meshing area N1 of the main gear plate 100 passes over the teeth 63 of the second driving lever 60 while not being meshed therewith. Accordingly, the defrost door plate DF is maintained in a closed state (d3). However, as the sliding section 111 formed at the distal end of the non-meshed rotation guide arm 110 of the main gear plate 100 is disengaged from the rounded guide face F1 formed on the guide section 57 of the first guide member 55 of the first driving lever 50 for driving the vent door plate VT, the teeth 101 formed over the meshing area G1 of the main gear plate 100 are meshed with the teeth 53 of the first driving lever 50 to rotate the first driving lever 50 in a clockwise direction. Hence, at the reference angle b, the vent door plate VT is fully opened (v2). Further, as the teeth 102 of the main gear plate 100 are meshed with the teeth 73 of the third driving plate 70, the third driving lever 70 is rotated in a clockwise direction. Accordingly, at the reference angle b, the heater door plate HT is fully closed (h3) (see the vent mode VENT of Table 1 and FIG. 10).

If the main gear plate 100 is rotated by 25 from the reference angle b in a clockwise direction, the defrost door plate DF is maintained in the closed state (d4), the vent door plate VT is half-closed (v3) due to the fact that the teeth 101 of the main gear plate 100 are meshed with the teeth 53 of the first driving lever 50 to rotate the vent door plate VT in a counterclockwise direction, and the heater door plate HT is half-opened (h4) due to the fact that the teeth 102 of the main gear plate 100 are meshed with the teeth 73 of the third driving lever 70 to rotate the heater door plate HT in a counterclockwise direction (see the bi-level mode BI-LEVEL of Table 1 and FIG. 10).

Consequently, by the fact that the main gear plate is provided with non-meshed rotation guide arms and the respective driving levers are provided with a guide member on which the non-meshed rotation guide arm can slide, with the driving levers cooperating with the main gear plate to selectively driving the door plates, when changing a design of an air conditioning system, various kinds of door driving mechanisms can be prepared by simply varying size of the main gear plate and driving levers.

Figure 11A:
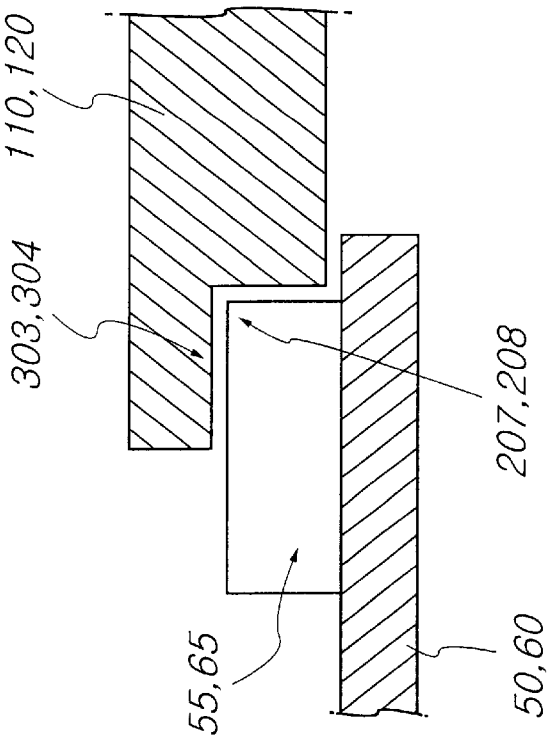
FIGS. 11A and 11B are enlarged cross-sectional views illustrating other constructions for the G part circled in FIG. 6, in accordance with other embodiments of the present invention.
Figure 11B:
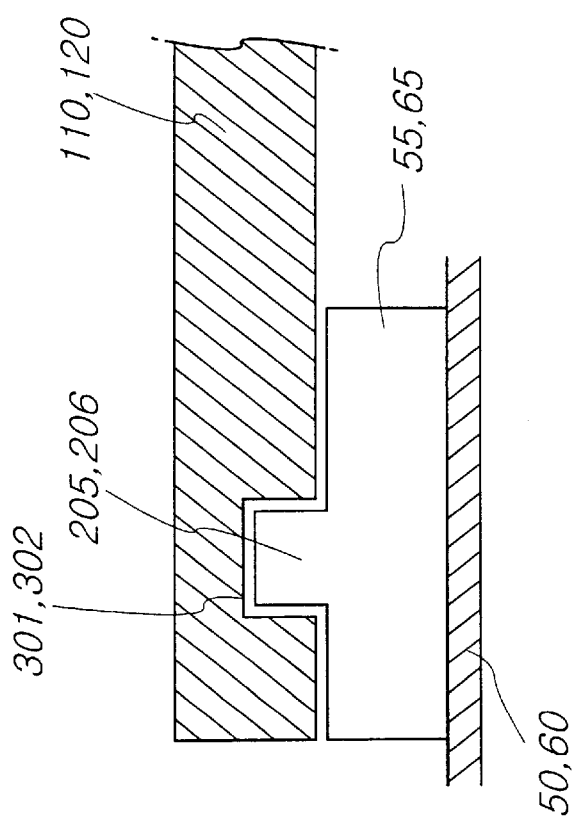
Figure 12:
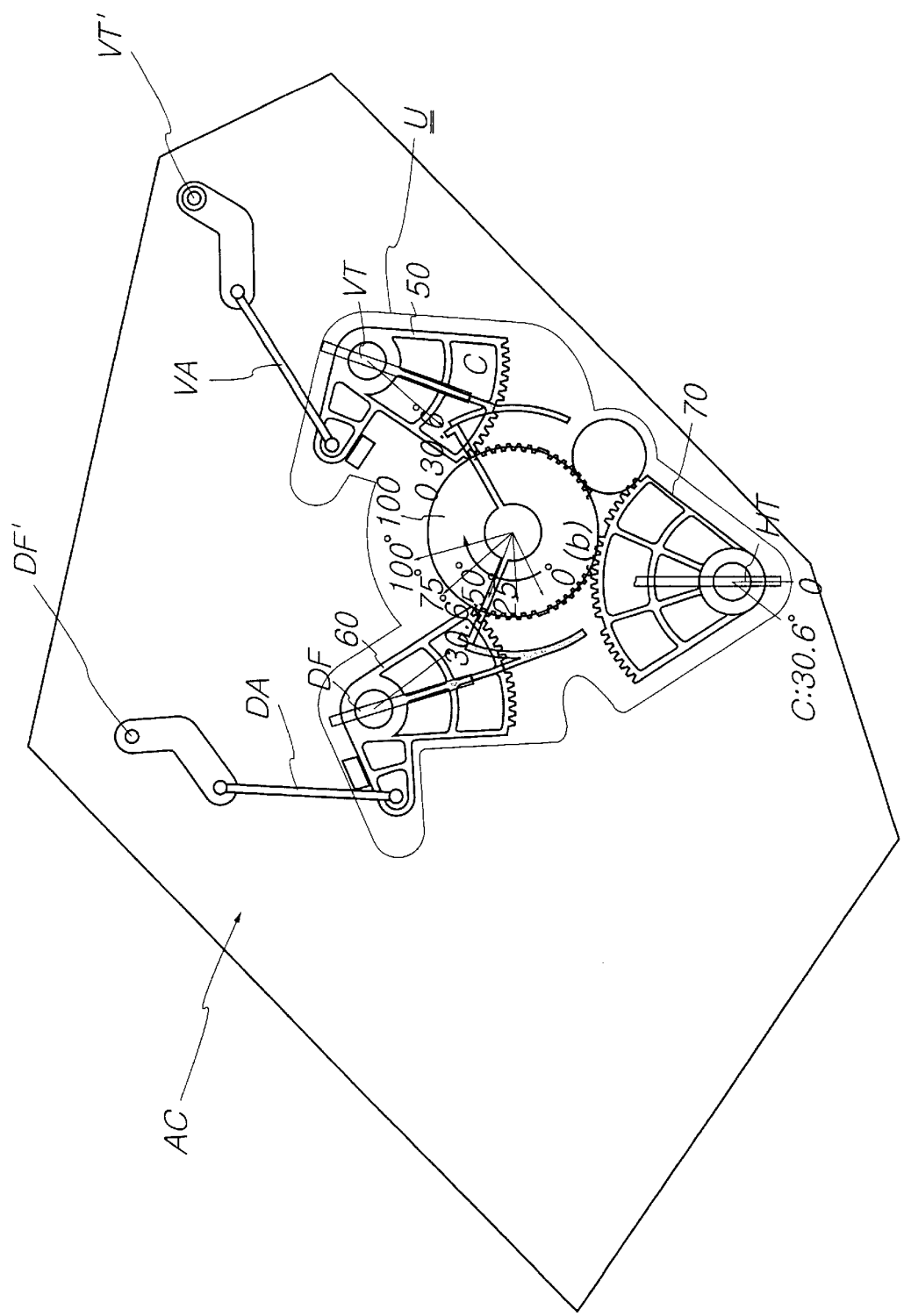
FIG. 12 is a plan view illustrating a state in which the door plate driving mechanism of the present invention is applied to another air conditioning case having a larger size.

FIGS. 11A and 11B are enlarged cross-sectional views illustrating other constructions for the G part circled in FIG. 6, in accordance with other embodiments of the present invention.

Referring to FIG. 11A, a pair of rounded guide grooves 301 and 302 are formed on the pair of non-meshed rotation guide arms 110 and 120, respectively, and the first and second guide members 55 and 65 of the first and second driving levers 50 and 60 are formed with a pair of rounded projections 205 and 206, respectively. The pair of rounded projections 205 and 206 can be selectively engaged into the pair of rounded guide grooves 301 and 302, respectively, as the main gear plate 100 is rotated. Accordingly, it is to be readily understood that the present embodiment achieves the same working effect as that of the first embodiment illustrated in FIG. 6.

Referring to FIG. 11B, a pair of rounded cut portions 303 and 304 are formed on the pair of non-meshed rotation guide arms 110 and 120, respectively, and the first and second guide members 55 and 65 of the first and second driving levers 50 and 60 are formed with a pair of projections 207 and 208, respectively, each having at least one rounded face. The pair of projections 207 and 208 can be selectively engaged onto the pair of rounded cut portions 303 and 304, respectively, as the main gear plate 100 is rotated. Accordingly, it is to be readily understood that the present embodiment achieves the same working effect as that of the first embodiment illustrated in FIG. 6.

Of course, the non-meshed rotation guide arms 110 and 120 and the first and second guide members 55 and 65 can have other sliding engagement schemes.

If the door plate driving mechanism of the present invention is manufactured as a unit such that the driving levers and the main gear plate have standardized sizes and is applied to a larger air conditioning case, a vent door plate VT and a defrost door plate DF which are separated from the first and second driving levers 50 and 60, can be connected to the first and second driving levers 50 and 60 by means of lever arms VA and DA, respectively, whereby the mechanism of the present invention can be dedicated to a differently sized air conditioning case without changing the sizes of the main gear plate and driving levers. In addition, intermediate gears for intermediately transferring the driving force can be used instead of the lever arms VA and DA.

As described above, by a door plate driving mechanism according to the present invention, advantages are provided in that a main gear plate is provided with non-meshed rotation guide arms and driving levers are provided with guide members, respectively, on which the non-meshed rotation guide arms can slide, respectively, with the driving levers cooperating with the main gear plate to selectively drive a plurality of door plates. As a result, the door plate driving mechanism of the present invention is simplified in its structure and can be easily assembled, whereby manufacturing cost is remarkably reduced while operational reliability is enhanced. Moreover, the door plate driving mechanism of the present invention can be applied to diverse air conditioning systems having various sizes and shapes.

In addition, by the fact that the door plate driving mechanism can be standardized, the problems occurring in the prior art due to trial and error in designing a door plate driving mechanism, are overcome. Accordingly, the door plate driving mechanism of the present invention can be conveniently applied to various kinds of air conditioning systems. Further, since a gear mechanism is used instead of a lever mechanism, noise is obviously reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An air conditioning system for an automobile including plurality of door plates being rotatably mounted to an air conditioning case for being operated under a multitude of air conditioning mode, the air conditioning system comprising:

actuator means for generating a rotating force to operate at least one door plate under a selected air conditioning mode, the actuator means having an output shaft;

a main gear plate secured to the output shaft of the actuator means and having a first driving section and a first mesh limiting section which are integrally stacked with each other, the first driving section having a plurality of first toothed portions for transferring the rotating force; and a plurality of driving levers fixed to a plurality of door plates, respectively, each of the driving levers having a second driving section and a second mesh limiting section which are integrally stacked with each other, the second driving section having a second toothed portion which is capable of being meshed with at least one of the plurality of first toothed portions of the main gear plate for driving at least one door plate under the selected air conditioning mode, the second mesh limiting section cooperating with the first mesh limiting section for effecting non-meshed rotation of the main gear plate.

2. An air conditioning system for an automobile, including a plurality of door plates being rotatably mounted to an air conditioning case for being operated under a multitude of air conditioning modes, the air conditioning system comprising:

actuator means for generating a rotating force, the actuator means having an output shaft;

a main gear plate secured to the output shaft of the actuator means for being integrally rotated therewith and having a plurality of first toothed portions and a plurality of non-meshed rotation guide arms, the first toothed portions being formed on a circumferential outer surface of the main gear plate such that they are circumferentially spaced part one from another, the non-meshed rotation guide arms being formed on one surface of the main gear plate such that they are circumferentially spaced apart one from another and extend radially from a center of the main gear plate; and first, second and third driving levers fixed to a plurality of door plates, respectively, each of the driving levers having a second toothed portion which is capable of being meshed with at least one of the plurality of the first toothed portions of the main gear plate, each of the first and second driving levers including a rounded rotation guide section on which at least one of the plurality of non-meshed rotation guide arms can slide to effect non-meshed rotation of the main gear plate thereby to operate at least one door plate under a selected air conditioning mode.

3. An air conditioning system for an automobile, comprising:

a heater door plate, a vent door plate and a defrost door plate disposed on a single plane of an air conditioning case for being operated under a multitude of air conditioning modes, the air conditioning case defining a part of an conditioning path;

first through third driving levers secured to hinge shafts of the heater door plate, vent door plate and defrost door plate for driving the plates while each of the first through third driving levers having teeth are integrally rotated therewith;

a main gear plate for selectively rotating at least one of the first through third driving levers while being meshed with the teeth of the first through third driving levers, relying upon a selected air conditioning mode; and mesh limiting means provided to the first and second driving levers and the main gear plate for selectively restraining the teeth of the first and second driving levers from being meshed with the main gear plate while the main gear plate is rotated, relying upon the selected air conditioning mode.

4. The air conditioning system for an automobile as claimed in claim 3, wherein the first through the third driving levers have sector gear-shaped configurations which have predetermined radii of curvature from the centers of the hinge shafts and predetermined central angles.

5. The air conditioning system for an automobile as claimed in claim 3, wherein the mesh limiting means provided to the first and second driving levers comprise a plurality of guide members which are integrally formed with the first and second driving levers, each of the guide members having a rib section and a guide section, the rib section having a plate-shaped configuration and extending radially, the guide section being fastened to one end of the rib section and having a rounded guide face of a predetermined radius of curvature from a center of the main gear plate.

6. The air conditioning system for an automobile as claimed in claim 3, wherein the main gear plate has a disk-shaped configuration, and includes a plurality of operating areas over which teeth are formed on a circumferential outer surface of the main gear plate and a plurality of non-operating areas over which no teeth are formed on the circumferential outer surface of the main gear plate.

7. The air conditioning system for an automobile as claimed in claim 3, wherein the mesh limiting means provided to the main gear plate having the disk-shaped configuration and including the plurality of operating areas over which teeth are formed and the plurality of non-operating areas over which no teeth are formed, comprises a plurality of non-meshed rotation guide arms which are integrally formed on one surface of the main gear plate and have predetermined radial lengths from the center of the main gear plate, the plurality of non-meshed rotation guide arms forming a plurality of predetermined controlling angles, each of the angles are defined between the two adjacent non-meshed rotation guide arms and having one end which can slide on the rounded guide faces of the first through third driving levers, respectively.

8. The air conditioning system for an automobile as claimed in claim 7, wherein the predetermined radii of curvature of the rounded guide faces of the first and second driving levers are substantially the same as the predetermined radial lengths of the non-meshed rotations guide arms which correspond to the first and second driving levers, respectively.

9. The air conditioning system for an automobile as claimed in claim 3, further comprising:

a reverse gear plate for reversely rotating the heater door plate relative to the rotation of the main gear plate, the reverse gear plate having teeth which are formed on an entire circumferential outer surface of the reverse gear plate.

10. The air conditioning system for an automobile as claimed in claim 3, wherein selective operation of the heater door plate, vent door plate and defrost door plate relying upon the selected air conditioning mode is implemented by selective meshing between the teeth formed on the circumferential outer surface of the main gear plate over the plurality of operating areas and the teeth formed on the first through third driving levers, and by selective sliding engagement between one ends of the plurality of non-meshed rotation guide arms and the rounded guide faces of the first through third driving levers.

11. The air conditioning system for an automobile as claimed in claim 3, wherein each of the first through third driving levers selectively meshed with the main gear plate, drives at least one door plate.

* * * * *